July 3, 1956     D. F. MELTON     2,753,133
MULTIPLE BALLOON OPERATION
Filed Feb. 14, 1955
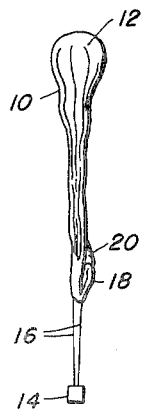
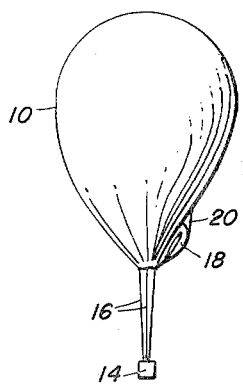
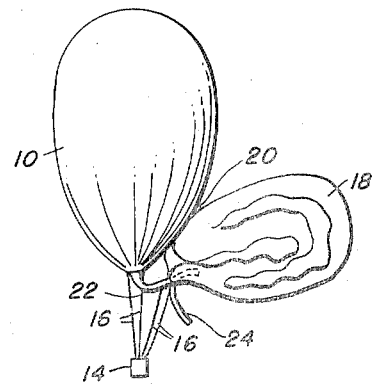
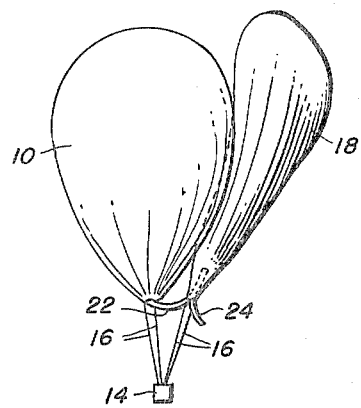
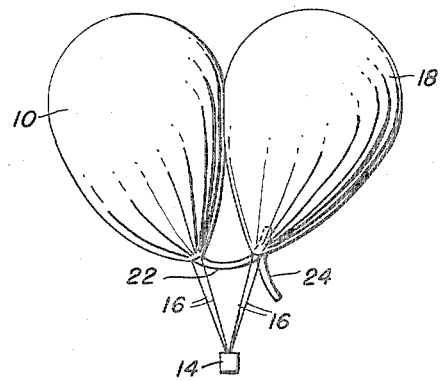
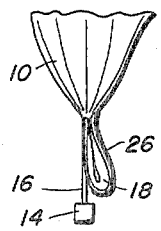
INVENTOR:
DONALD F. MELTON
BY
ATT'YS

United States Patent Office 2,753,133
Patented July 3, 1956

2,753,133

MULTIPLE BALLOON OPERATION

Donald F. Melton, Minneapolis, Minn., assignor, by mesne assignments, to the United States of America as represented by the Secretary of the Navy Application February 14, 1955, Serial No. 488,173

11 Claims. (Cl. 244—31)

This invention relates to a method of balloon flight in which a number of balloons are connected together for utilizing the expansion of an inflated balloon to also inflate another balloon by transferring overflow gas from an inflated balloon to one or more uninflated balloons during flight.

In high altitude balloon flights, a balloon is only partially inflated for take-off, but as it ascends, the inflation gas expands; and if the balloon appendix is open, some of the gas may escape, thereby reducing the flight ceiling and limiting the amount of useful load that can be carried.

In the present method, this loss of gas is prevented by carrying one or more other balloons in a folded condition but still connected to the originally inflated balloon to receive the expanded gas and thereby to unfold and inflate an additional balloon or balloons depending upon the load carried and the altitude desired.

An important object of the invention is to provide a new and improved system for connecting balloons in multiple relation for utilizing the gas from an inflated balloon in an uninflated balloon carried thereby during flight.

A further object of the invention is to provide an inflated balloon and an uninflated balloon carried thereby with a tubular connection between the balloons to transfer gas from one balloon to the other.

A still further object of the invention is to provide for a multiple balloon flight by suspending a folded and uninflated balloon from an inflated balloon utilizing the appendix of the inflated balloon to conduct overflow gas to the uninflated balloon during flight and to utilize the appendix of the uninflated balloon for overflow pressure from both balloons.

A further object of this multiple balloon flight method is that uninflated balloons may be folded and packed in connection with the inflated balloons so that the launching and handling problem is much easier and is reduced to that of handling inflated balloons.

Other objects of the invention will appear in the specification and will be more apparent from the accompanying drawings, in which—

Fig. 1 represents an inflated balloon at take-off with a small lifting charge of gas and carrying an uninflated balloon in folded condition;

Fig. 2 is an elevational view of an inflated balloon at its pressure altitude carrying an uninflated balloon just about ready to receive gas under pressure from the inflated balloon;

Fig. 3 is an elevational view of an inflated balloon and showing the carried balloon in partially inflated condition receiving gas from the inflated balloon;

Fig. 4 is an elevational view showing the inflated balloon and a carried balloon in partially inflated condition at the side of the inflated balloon;

Fig. 5 is an elevational view showing the two balloons connected by a transfer tube at the bottom and about equally inflated at the pressure of both balloons; and Fig. 6 is a fragmentary elevational view showing an uninflated balloon folded and supported in a pouch carried at the lower end of an inflated balloon.

This invention relates to a method of carrying out a multiple balloon flight in which not all of the balloons are inflated at take-off. Those which are not inflated at take-off are subsequently inflated by the overflow gas from an inflated balloon or balloons as the initial pressure altitude is reached. Overflow gas is conducted from the inflated balloons to the uninflated ones by tubular connections.

Referring now more particularly to the drawings in describing this method of multiple flight, a balloon 10 of conventional shape is shown in Fig. 1 having a small lifting charge in its upper end 12 sufficient to raise it and a pay load 14 carried by the balloon with suspension tapes 16. A folded uninflated balloon 18 is carried at the bottom of the inflated balloon and may be additionally suspended by a connection or a tape 20 which is disengaged from the inflated balloon when the uninflated balloon 18 receives gas therefrom.

As the inflated balloon carrying the uninflated one ascends, the gas expands until this balloon reaches its pressure altitude, as represented in Fig. 2, whereupon the overflow gas would be lost if the balloon has an open appendix at the bottom. An appendix 22 of the inflated balloon is therefore connected into the carried balloon 18 which now becomes partially inflated, as shown in Fig. 3, breaking its connection with the tape 20 and allowing the folded balloon to rise at the side of the first inflated balloon, as shown in Fig. 4.

A continued transfer of the gas from the first balloon 10 to the folded balloon 18 may result in a complete equalization of balloons so that they are substantially uniform in size, as shown in Fig. 5. In this case, if the appendix 22 of the inflated balloon 10 is inserted into the balloon 18, an appendix 24 of the folded balloon 18 may become the discharge for any overflow of gas from the inflated balloons.

Two methods are suggested in carrying inflated balloons; one, by suspension from the inflated balloon, as in Figs. 1 and 2, or by suspending the folded balloon in a pouch 26, as shown in Fig. 6. In the latter case, the folded balloon will be forced out of the pouch or the pouch will be broken when the overflow of gas passes from the inflated balloon 10 into the folded balloon 18.

In carrying out this method, an uninflated balloon at take-off may be folded and packed so that it is easily attached and carried by the inflated balloon. Since it is now unnecessary to handle such a large balloon, the handling problem is reduced to that of handling the inflated balloons only.

As the pressure altitude for both balloons is reached, overflow gas from the first balloon may be still fed into the second balloon, and the appendix of the second balloon then acts as an appendix for both balloons. This holds for an open-appendix type of balloons. For a pressure-type balloon, a transfer tube which connects the balloons would be sealed to both appendix openings to retain the gas pressure therein.

While the preferred method of carrying out this multiple balloon flight has been described in detail, it should be regarded as an example or embodiment of the invention and not as a restriction or limitation therein as many changes may be made in the construction and arrangement of the parts without departing from the spirit and scope of the invention.

I claim:

1. The method of carrying out a multiple balloon flight which comprises inflating one balloon, carrying an uninflated balloon with the inflated one, and automatically transferring excess gas as it expands during flight from the inflated balloon into the uninflated balloon.

2. The method of multiple balloon flight in accordance with claim 1 which comprises carrying a plurality of uninflated balloons with the inflated one, and automatically transferring gas as it expands during flight from the inflated balloon to one or more uninflated balloons in succession.

3. In the method of multiple balloon flight according to claim 1, the step of discharging excess gas as it expands during flight from the uninflated balloon to the atmosphere.

4. In the method of multiple balloon flight according to claim 2, the step of discharging excess gas as it expands in the balloons during flight from the last of the balloons in said succession to the atmosphere.

5. In the method of multiple balloon flight according to claim 1, the step of folding and packing an uninflated balloon to be carried by the inflated balloon, and the uninflated balloon being unfolded and expanded automatically during flight by excess gas from the inflated balloon.

6. In the method of multiple balloon flight according to claim 5, the step of suspending a folded uninflated balloon from the inflated balloon in a container from which it is discharged as the uninflated balloon becomes inflated.

7. The method of multiple flight which comprises inflating one balloon at take-off, carrying an uninflated balloon in folded position with the inflated one, automatically discharging excess gas from the second balloon into the atmosphere.

8. In multiple balloon operation, the combination with an inflated balloon, of an uninflated balloon carried thereby, an open tubular discharge appendix connected to the inflated balloon and extending into the uninflated balloon to conduct excess gas thereto, an open tubular discharge appendix connected to the uninflated balloon for conducting gas from the uninflated balloon after it becomes inflated from the first balloon to the atmosphere.

9. In multiple balloon operations, the combination with an inflated balloon having an opening gas appendix extending therefrom of an uninflated balloon also having an opening gas appendix extending therefrom, means for carrying the uninflated balloon from the inflated balloon, the appendix of the inflated balloon extending into the uninflated balloon to conduct excess gas from the inflated to the uninflated balloon, and the appendix of the uninflated balloon discharging excess gas therefrom into the atmosphere.

10. In multiple balloon operation according to claim 9, the uninflated balloon being carried in folded collapsed condition and being unfolded and expanded by excess gas from the inflated balloon to an extent depending upon the amount of overflow to form the inflated balloon.

11. In multiple balloon operation according to claim 9, a plurality of uninflated balloons carried by the inflated balloon in folded forms at take-off, the appendix of the inflated balloon extending into one of the uninflated balloons, and the appendix of each uninflated balloon in series with the appendix of the last uninflated balloon discharging into the atmosphere.

References Cited in the file of this patent

UNITED STATES PATENTS

| | | |
|---|---|---|
| 721,051 | King | Feb. 17, 1903 |
| 1,004,662 | Kuenzel | Oct. 3, 1911 |

FOREIGN PATENTS

| | | |
|---|---|---|
| 227,155 | Germany | Oct. 15, 1910 |